(12) United States Patent
Frommann et al.

(10) Patent No.: US 9,623,819 B2
(45) Date of Patent: Apr. 18, 2017

(54) METHOD FOR CONTROLLING A LIGHTING BRIGHTNESS OF A LIT MOTOR VEHICLE INSTRUMENT AS WELL AS A MOTOR VEHICLE WITH AT LEAST ONE DIMMABLY LIT MOTOR VEHICLE INSTRUMENT

(71) Applicant: GM GLOBAL TECHNOLOGY OPERATIONS LLC, Detroit, MI (US)

(72) Inventors: Markus Frommann, Bingen am Rhein (DE); Michael Schreiber, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 14/575,721

(22) Filed: Dec. 18, 2014

(65) Prior Publication Data

US 2015/0175106 A1 Jun. 25, 2015

(30) Foreign Application Priority Data

Dec. 20, 2013 (DE) .......... 10 2013 021 644

(51) Int. Cl.
| | |
|---|---|
| *G06F 7/00* | (2006.01) |
| *B60R 16/037* | (2006.01) |
| *B60K 37/00* | (2006.01) |
| *B60Q 3/04* | (2006.01) |
| *B60K 35/00* | (2006.01) |
| *B60K 37/02* | (2006.01) |

(52) U.S. Cl.
CPC .......... *B60R 16/037* (2013.01); *B60K 35/00* (2013.01); *B60K 37/00* (2013.01); *B60K 37/02* (2013.01); *B60Q 3/048* (2013.01); *B60K 2350/2013* (2013.01); *B60K 2350/2069* (2013.01)

(58) Field of Classification Search
USPC ....... 353/13; 701/45, 36; 345/8, 7, 204, 690; 340/425.5; 248/148
See application file for complete search history.

(56) References Cited

U.S. PATENT DOCUMENTS

| | | | | |
|---|---|---|---|---|
| 2005/0131607 A1* | 6/2005 | Breed | ................... | B60N 2/002 701/45 |
| 2007/0096445 A1* | 5/2007 | Breed | ................... | B60N 2/002 280/735 |
| 2007/0135982 A1* | 6/2007 | Breed | ...................... | B60J 10/00 701/36 |
| 2008/0036187 A1* | 2/2008 | Breed | ............... | B60R 21/01516 280/735 |
| 2008/0036580 A1* | 2/2008 | Breed | ............... | B60R 21/01536 340/438 |
| 2008/0142713 A1* | 6/2008 | Breed | ................... | B60N 2/002 250/330 |
| 2008/0143085 A1* | 6/2008 | Breed | ............... | B60R 21/01516 280/735 |

(Continued)

*Primary Examiner* — Ronnie Mancho
(74) *Attorney, Agent, or Firm* — Lorenz & Kopf, LLP

(57) ABSTRACT

A method for controlling a lighting brightness of a lit motor vehicle instrument is described in which a viewing direction of a driver is ascertained. From the viewing direction of the driver, a direct field of vision and a peripheral field of vision are ascertained. The lighting brightness of the motor vehicle instrument is increased, if it lies in the direct field of vision of the driver. The method may be implemented in a motor vehicle.

15 Claims, 2 Drawing Sheets

(56) References Cited

U.S. PATENT DOCUMENTS

| | | | |
|---|---|---|---|
| 2008/0234899 A1* | 9/2008 | Breed | B60N 2/002 701/47 |
| 2008/0292146 A1* | 11/2008 | Breed | B60N 2/002 382/118 |
| 2008/0294315 A1* | 11/2008 | Breed | B60N 2/002 701/49 |
| 2009/0066065 A1* | 3/2009 | Breed | B60J 10/00 280/735 |
| 2009/0092284 A1* | 4/2009 | Breed | B60J 10/00 382/103 |
| 2010/0253489 A1* | 10/2010 | Cui | G01S 13/723 340/425.5 |
| 2010/0253595 A1* | 10/2010 | Szczerba | G01C 21/365 345/7 |
| 2010/0253918 A1* | 10/2010 | Seder | G01S 13/723 353/13 |
| 2011/0213664 A1* | 9/2011 | Osterhout | G02B 27/017 705/14.58 |
| 2012/0018989 A1* | 1/2012 | Breed | B60R 21/01516 280/735 |

* cited by examiner

METHOD FOR CONTROLLING A LIGHTING BRIGHTNESS OF A LIT MOTOR VEHICLE INSTRUMENT AS WELL AS A MOTOR VEHICLE WITH AT LEAST ONE DIMMABLY LIT MOTOR VEHICLE INSTRUMENT

CROSS REFERENCE TO RELATED APPLICATION

This application claims priority to German Patent Application No. 102013021644.3 filed Dec. 20, 2013, which is incorporated herein by reference in its entirety.

TECHNICAL FIELD

A method is described for controlling a lighting brightness of a lit motor vehicle instrument as well as a motor vehicle with at least one dimmably lit motor vehicle instrument.

BACKGROUND

DE 10 2012 010 757 A1 discloses an illuminating device for a vehicle. The illuminating device includes an eye-tracking system for detecting an eye position and its viewing direction. The illuminating device is divided into several predefined switch-on ranges, and light is emitted only into that predefined switch-on range which corresponds to the user's field of vision. No light is emitted as soon as the user's field of vision does not correspond to the respective predefined switch-on range.

The disadvantage, however, consists in that drivers of a motor vehicle during darkness frequently orientate themselves using the lighting of motor vehicle instruments. If the instruments are always completely switched-off as soon as the driver ceases to look in their direction, the driver loses his orientation more easily, which may make operation of the motor vehicle more difficult.

This leads to the requirement to further develop a method to address this disadvantage in such a way that it becomes easier for the driver to orientate himself in a dark motor vehicle without being irritated by the lighting of at least one motor vehicle instrument.

SUMMARY

A method is provided for controlling the lighting brightness of a lit motor vehicle instrument, a computer program product for carrying out this method as well as a motor vehicle with at least one dimmably lit motor vehicle instrument. Further developments of the method as well as the motor vehicle are also provided in the present disclosure.

A method for controlling a lighting brightness of a lit motor vehicle instrument ascertains a viewing direction of a driver. A direct field of vision and a peripheral field of vision are ascertained from the driver's viewing direction. The lighting brightness of the motor vehicle instrument is increased if it lies in the direct field of vision of the driver.

In terms of the present description a motor vehicle instrument may be a display device as well as an operating element. Such display devices may, for example, be a cockpit or a screen of a driver information system arranged in driving direction in front of a steering wheel. Such a screen may frequently display information referring to the navigation of the vehicle, to multimedia systems as well as to the vehicle configuration. Operating elements may for example be keys, buttons or switches used for operating the motor vehicle. Such an operating element may also be a contact-sensitive screen.

Ascertaining a direct field of vision and a peripheral field of vision makes it possible for the lighting brightness of the lit motor vehicle instrument to be set so as to better match the viewing direction of the driver, depending on the respective situation. In terms of the method according to the present disclosure it is, for example, possible to retain some lighting brightness of the motor vehicle instrument, without controlling it right down to zero as long as the instrument is still within the peripheral field of vision of the driver. This helps the driver to orientate himself more easily in the motor vehicle.

According to a first aspect of the method an eye position of the driver is ascertained. By ascertaining the position of the eyes of the driver in the motor vehicle and relative to the motor vehicle instruments, the lighting brightness can be even more selectively controlled.

A further aspect of the method relates to the calculation of an illumination of the motor vehicle instrument reflected by windows of the motor vehicle from a position and alignment of the windows relative to the position of the driver or his or her eyes. The lighting brightness of the motor vehicle instrument is reduced if the reflections of the motor vehicle instrument lie within the field of vision of the driver. Particularly in a dark environment reflections of motor vehicle instruments such as the cockpit or a monitor are visible in windows and may lead to erroneous perceptions. By adapting the lighting brightness of the lit motor vehicle instrument as soon as the driver looks in a direction in which a reflection in a window, for example in a front window or a side window, is probable, such irritating reflections can be reduced or altogether avoided. The view out of the motor vehicle into the dark environment is thus unaffected.

Furthermore provision may be made for an eye position of the driver to be ascertained and to be included in the calculation of the locations of the reflections of the motor vehicle instrument. This gives more control over the adaptation of the lighting brightness and avoids an excessively sudden change in lighting brightness.

It is possible for the lighting brightness to be reduced to zero if the reflection of the motor vehicle instrument lies within view of the driver. In this way any deterioration in vision can be avoided.

The lighting brightness of the motor vehicle instrument may include several steps or grades, where the lighting brightness of the motor vehicle instrument is set to a medium brightness if the motor vehicle instrument lies within the peripheral field of vision of the driver.

"Medium brightness" in terms of the present description is an intermediate brightness or in other words a brightness which lies between having the lighting of the motor vehicle instrument completely switched-off and a maximum brightness, not necessarily within the central range. Medium brightness may for example refer to an adapted brightness which in turn may depend on the environmental brightness. As such the lighting brightness in some developments of the method may depend on the environmental brightness and can be automatically adapted, for example in that the brightness is reduced as soon as the environment becomes darker. Also in the respectively offered lighting brightness spectrum the "medium brightness" need not necessarily lie in a physical medium range, but may be arranged in an ergonomically appropriate brightness range, which for example, may lie in the lower third of the offered brightness spectrum of the lighting.

Setting the lighting brightness of the motor vehicle instrument in this way means that the motor vehicle instrument is visible in the peripheral field of vision. But blinding of the driver is avoided.

Furthermore a change in the viewing direction of the driver can be detected. If the driver changes his viewing direction in direction towards the motor vehicle instrument, the lighting brightness of the motor vehicle instrument is increased. If the driver's viewing direction changes away from the motor vehicle instrument, the lighting brightness of the motor vehicle instrument is reduced. The change in lighting brightness may be in steps or continually, resulting in the motor vehicle instrument becoming increasingly more or increasing less noticeable in the perception range of the driver. A steady or quasi steady change also results in the driver not being distracted by a sudden switching-on or switching-off of the lighting.

A computer program product with a computer-readable storage medium is also disclosed which has commands embedded into it which when executed by a computer unit cause the computer unit to execute the method according to the above described embodiments.

A device for controlling a lighting brightness of a lit motor vehicle instrument is also disclosed. The device is configured to ascertain a viewing direction of a driver and optionally ascertaining a direct field of vision and a peripheral field of vision from the viewing direction of the driver. The device is operable to increase the lighting brightness of the motor vehicle instrument, if it lies in the direct field of vision of the driver. The device may also be operable to increase the lighting brightness of the motor vehicle instrument for reducing the lighting brightness of the motor vehicle instrument. Furthermore, the device is configured to ascertain a position of the eyes of the driver. Alternatively this may be accomplished by ascertaining the viewing direction of the driver.

According to a further aspect the device may use a position and an alignment of windows of the motor vehicle to calculate locations of reflections of the lighting of the motor vehicle instrument. The lighting brightness of the motor vehicle instrument is increased to reduce the lighting brightness of the motor vehicle instrument if the reflections of the motor vehicle instrument lie within the driver's field of vision.

According to a further aspect the device may ascertain a position of the eyes to ascertain a driver's eye position for use in the calculation of locations of reflections in the calculation of locations of reflections of the motor vehicle instrument.

Moreover, the lighting brightness of a lit motor vehicle instrument may include several steps, wherein reducing the lighting brightness is configured to set the lighting brightness of the motor vehicle instrument to match a medium brightness if the motor vehicle instrument lies in the peripheral field of vision of the driver.

According to a further aspect the device ascertains the viewing direction and/or the driver's eye position and is configured to detect a change in the driver's viewing direction, wherein reduction of the lighting brightness are configured, for a change in the driver's viewing direction in direction towards the motor vehicle instrument, to increase the lighting brightness of motor vehicle instrument, wherein the means for reducing the lighting brightness are configured, for a change in the driver's viewing direction in a direction away from the motor vehicle instrument, to reduce the lighting brightness of the motor vehicle instrument.

Moreover the device detects a viewing direction and/or a change in viewing direction, wherein reduction of the lighting brightness is configured, for a change in viewing direction in direction of the location of a reflection of the motor vehicle instrument in a window, to reduce the lighting brightness of the motor vehicle instrument.

The device for detection of a viewing direction, for detecting an eye position and/or for reducing the lighting brightness may be provided in the form of one or several control devices which may include microchips.

Furthermore a device for controlling a lighting brightness of the lit motor vehicle instrument is described. The device for ascertaining a driver's viewing direction from the driver's viewing direction, a direct field of vision and a peripheral field of vision is ascertained. A control is provided with which the lighting brightness of the motor vehicle instrument is increased, if it lies in the driver's direct field of vision. A computing device may be provided for ascertaining the driver's viewing direction, and this evaluates respective information of the ascertaining device.

Furthermore a device for ascertaining the driver's eye position may be provided. The device for ascertaining the driver's eye position relative to the motor vehicle may be configured separately, or may be part of the device for ascertaining the driver's viewing direction, or both devices may be identical in certain developments in that a device is provided which ascertains both the driver's viewing direction and his eye position.

Moreover a device for storing the position and alignment of windows of the motor vehicle may be provided. The device is provided with which locations of reflections of the lighting of the motor vehicle instrument are calculated. The control for the lighting brightness of the motor vehicle instrument is developed in such a way that the lighting brightness of the motor vehicle instrument is reduced if the reflections of the motor vehicle instrument lie in the driver's field of vision.

Here again, use may be made of the device for ascertaining the eye position, and the information on the driver's eye position may be included in the calculation of the locations of reflections of the motor vehicle instrument in the windows.

The control device may be configured to set the lighting brightness from zero to a maximum value. Setting the lighting brightness may be effected in several steps or be adapted continually. The control device may be arranged to set the lighting brightness of the motor vehicle instrument to a medium brightness if the motor vehicle instrument lies in the driver's peripheral field of vision.

Furthermore a device for detecting a change in the driver's viewing direction may be provided. This device may be part of the device for detecting the viewing direction and/or the eye position. The control may be designed such that for a change in the driver's viewing direction in a direction towards the motor vehicle instrument, the lighting brightness of the motor vehicle instrument is increased or, for a change in the driver's viewing direction in a direction away from the motor vehicle instrument, the lighting brightness of the motor vehicle instrument is reduced. Both can be affected in steps or continually.

A further subject of the present description relates to a motor vehicle with at least one dimmably lit motor vehicle instrument and at least one viewing direction sensor which are used for detecting the viewing direction of a driver of the motor vehicle and for ascertaining the driver's direct field of vision and peripheral field of vision. Further, a control for the motor vehicle instrument is provided which is arranged to set the lighting brightness of the motor vehicle instrument in dependence of the driver's viewing direction and the driver's direct and peripheral field of vision.

With a vehicle equipped in this way it is possible to adapt the illumination of a motor vehicle instrument at dusk and/or in darkness in such a way that it supports a driver, but does not hinder him while driving the motor vehicle. By differentiating between a direct and a peripheral field of vision it is possible to adapt the brightness of the lighting of the motor vehicle instrument in dependence of whether the motor vehicle instrument lies in the driver's direct or peripheral field of vision.

According to a possible development of the motor vehicle an eye position sensor may be provided for detecting the position of the driver's eyes in the motor vehicle. In this way the possible effects of the lighting of the motor vehicle instrument upon the driver can be better calculated.

According to a possible development the illumination of the motor vehicle instrument may assume at least the following lighting brightnesses: off, maximum and an intermediate stage between off and maximum. In an alternative development the lighting brightness may be adapted in a steady or quasi-steady manner. By having at least three lighting brightnesses for the motor vehicle instrument adaptation of the brightness can be effected in dependence of whether the driver looks at the motor vehicle instrument directly, peripherally or not at all.

Furthermore a memory may be provided in which the position of the at least one motor vehicle instrument as well as the position of at least one window of the motor vehicle are stored. The information may be stored directly or after undergoing pre-processing in order to reduce computing power. Therefore a possible assumption includes if a driver looks through a front window his/her peripheral field of vision always captures most of, or all of, the surface of the front window. In this case there is no need for taking the alignment of the at least one window into account since it can be assumed that a reflection of the illumination of the motor vehicle instrument lies always at least in the driver's peripheral field of vision.

Furthermore a difference may be made between the windows through which the driver looks, i.e. the front window or the side window of the motor vehicle. If he looks through the front window, it may be helpful to switch the illumination of the motor vehicle instrument off completely in order to avoid any interfering reflection in the window.

In the respective vehicle the viewing direction sensor may be a camera. With the aid of a camera the driver's face may be captured, his eyes may be detected, and a viewing direction may be derived from the alignment of the eyes. In some developments the camera may be used to also detect the position of the driver's eyes.

According to a further aspect of the motor vehicle the at least one viewing direction sensor may include an infrared source. Using an infrared source in conjunction with a correspondingly equipped sensor system, e.g. a camera, the driver's eye position and direction of his eyes can be reliably captured also in darkness without the driver being blinded.

Also the motor vehicle may be equipped with a computer program product according to the above description.

A further aspect of the respective motor vehicle relates to providing at least two viewing direction sensors which, when viewed from different positions in driving direction, are arranged in front of the driver. Using at least two viewing direction sensors the position of the driver's head or eyes can be ascertained more accurately than when using just one viewing direction sensor.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
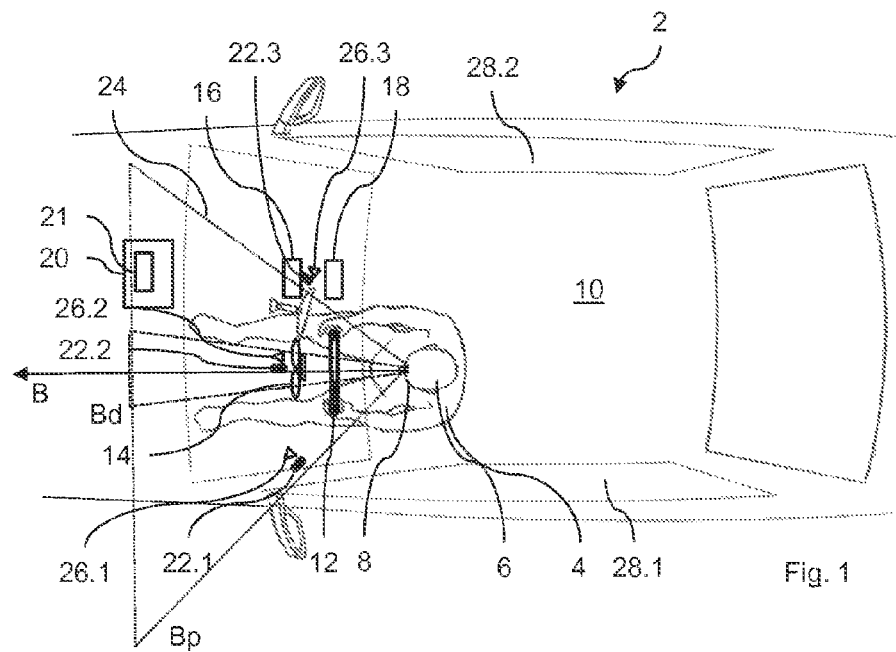
FIG. 1 shows a top view of a motor vehicle equipped according to the present disclosure.

FIG. 1 shows a top view of a motor vehicle 2. The motor vehicle 2 has a driver 4 sitting in it. The driver 4 has a head 6 with a pair of eyes 8. The pair of eyes 8 looks into a viewing direction B. Further the pair of eyes 8 is arranged at a certain position in a passenger cell 10 of the motor vehicle 2.

A cone-shaped direct field of vision B is arranged around the driver's 4 viewing direction, and adjacent to this is a peripheral field of vision Bp. The direct field of vision forms a relatively small cone; the peripheral field of vision of the driver 4 is much wider.

The driver 4 receives information from a plurality of motor vehicle instruments which when it is dark can be illuminated. These include the instruments 14 arranged in viewing direction B in front of the steering wheel 12 as well as a monitor 16. Furthermore operating elements 18 are arranged in the vicinity of the driver. The operating elements 18 can also be illuminated.

A control 20 is provided for controlling the lighting brightness of the instruments 14, the monitor 16 and the operating elements 18. The lighting brightness of these can be controlled with the aid of the control 20 as specified by the driver, or as will now be described, in dependence of the viewing direction B of the driver 4. The control 20 includes a memory 21 in which the position of the instruments 14, 16, 18 and of windows 24, 28.1, 28.2 are stored.

The instruments lie in the direct field of vision Bd, the monitor 16 as well as the operating elements 18 lie in the peripheral field of vision Bp.

The motor vehicle 2 is equipped with three cameras 22.1, 22.2 and 22.3, and these are arranged between the driver 4 and a front window 24 and are directed at the driver 4. Infrared illuminating devices 26.1, 26.2 and 26.3 are arranged adjacent to the cameras 22.1, 22.2 and 22.3. The head 6 of the driver 4 is illuminated by the infrared illuminating devices 26.1, 26.2 and 26.3 when environmental brightness is low, i.e. when it is dark, which gives the cameras 22.1 to 22.3 sufficient signals for detecting the position and viewing direction B of the pair of eyes 8. Since human eyes are insensitive to infrared light, the driver 4 is not blinded by this illumination, i.e. his perception is not affected.

Side windows 28.1, 28.2 are arranged adjacent to the front window 24. The front window 24 and the side windows 28.1 and 28.2 are, to a certain degree, reflective, which means that light from the instruments 14, the monitor 16 and the elements 18 which is incident upon the front window 24 or the side windows 28.1 or 28.2 is reflected and may possibly fall into the view of the driver. The reflections, as shown in FIGS. 2 and 3, may be superimposed by a perception of the road, which possibly changes the perception of the road, because a driver may not necessarily recognize that this is a reflection of the road as such.

The cameras 22.1-22.3 are connected with the control 20, so that by means of the control 20 the viewing direction B and the direct field of vision Bd and the peripheral field of vision Bp can be ascertained. On the basis of this and by knowing the position and alignment of the front window 24 as well as of the side windows 28.1, 28.2, which are stored in the memory 21, it can be determined, whether on the one hand the motor vehicle instruments 14, the monitor 16 or the operating elements 18 or their reflections in the front window 24 or in one of the side windows 28.1 or 28.2 appear in the driver's direct field of vision Bd or peripheral field of vision Bp. This then allows the lighting brightness of the instruments 14, the monitor 16 and/or the operating elements 18 to be adapted in dependence of whether they appear in the direct field of vision Bd, the peripheral field of vision Bp or whether their reflections in the front window 24 or side windows 28.1 or 28.2 lie in the direct field of vision or in the peripheral field of vision.

It is therefore possible to adapt the lighting brightness of the instruments 14, the monitor 16 and/or the operating elements 18 in dependence of the viewing direction B, the direct field of vision Bd and the peripheral field of vision Bp. In one implementation the lighting brightness of a respective instrument 14, 16 or 18 could for example be reduced, as long as it lies in the driver's 4 peripheral field of vision Bp. As soon as it lies no longer in the driver's 4 peripheral field of vision Bp, the lighting can be completely deactivated. Moreover the lighting may be completely or mainly deactivated, when a reflection of the respective instrument 14, 16 or 18 in one of the windows 24, 28.1, 28.2 lies in the driver's 4 direct field of vision Bd and could thus alter the perception of the traffic on the road. The respective control combines good orientation inside the motor vehicle, which is possible with the aid of an at least a weak illumination of instruments of the motor vehicle, with an unimpeded perception of the surrounding road traffic.

Figure 2:
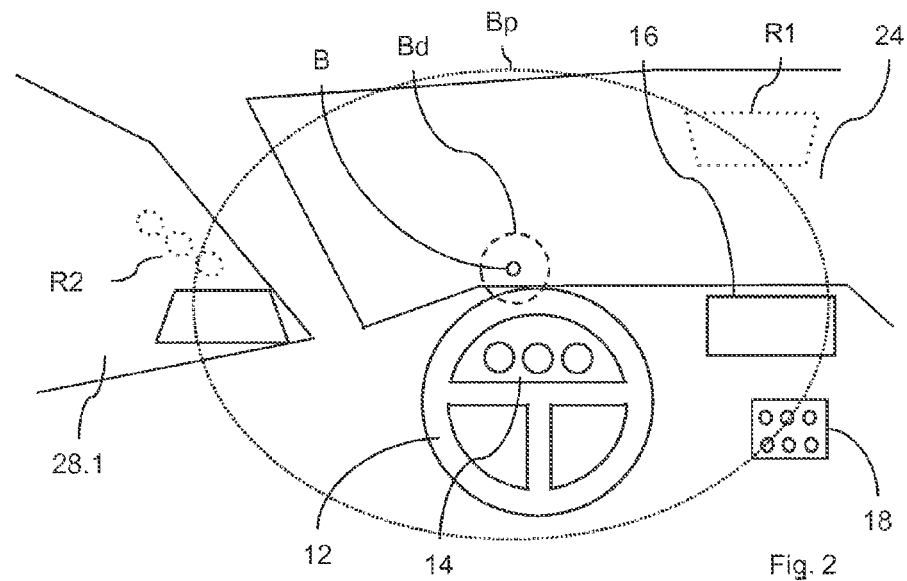
FIG. 2 shows a view of a cockpit of a motor vehicle from the driver's perspective with activated instrument lighting.

FIG. 2 shows the view of the driver 4 from his perspective. The driver's 4 direct field of vision Bd is circular and is arranged around his viewing direction B. His peripheral field of vision Bp is represented by a larger circle. The instruments 14 arranged behind the steering wheel 12 can be seen within the direct field of vision Bd. The monitor 16 and the operating elements 18 lie in the peripheral field of vision Bp. A reflection R1 can be recognized in the front window 24, and this is caused by the monitor 16. A reflection R2 is visible in the side window 28.1 and this is caused by the instrument 14.

Figure 3A:
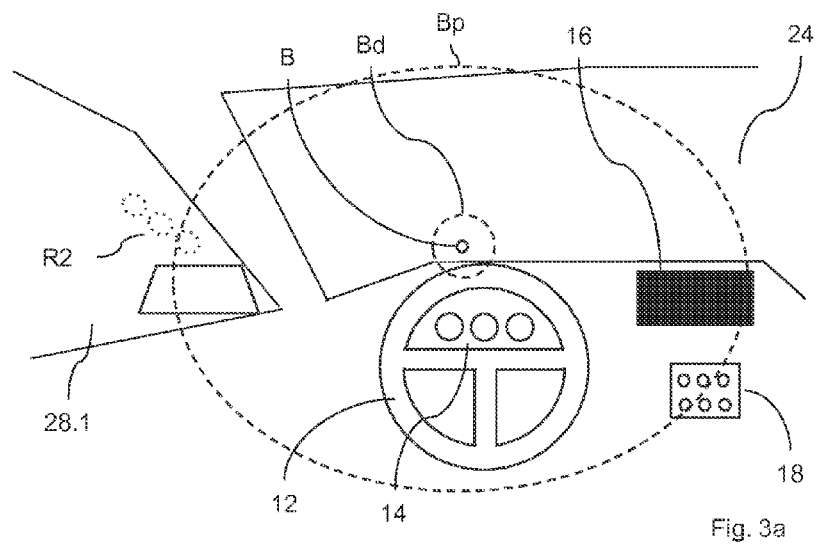
FIGS. 3a, 3b show the view onto the cockpit according to FIG. 2 for a motor vehicle which is operated according to the above-described idea for two different viewing directions.
Figure 3B:
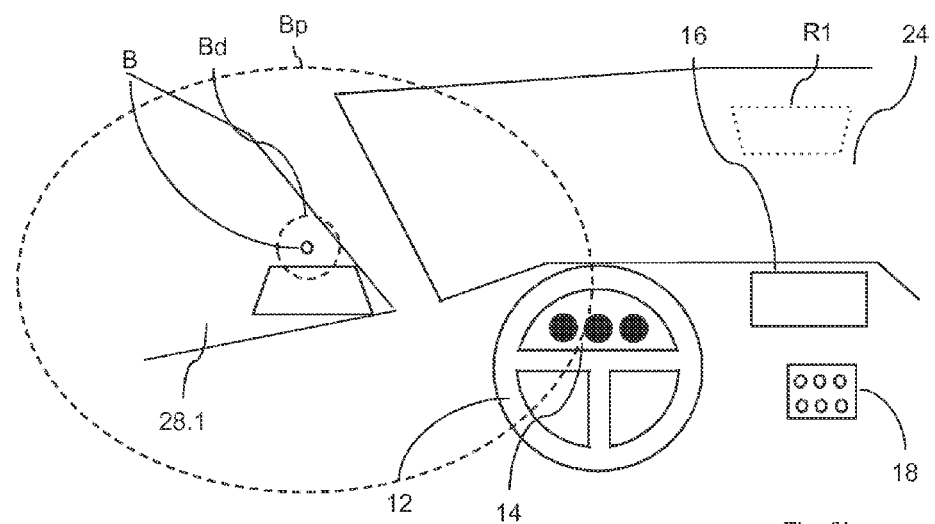

In FIG. 3a the viewing direction B is the same as in FIG. 2. The brightness of the monitor 16 however is reduced, in order to eliminate the reflection R1 visible in FIG. 2. The brightness of the operating elements 18 is also reduced but not completely down to zero, in order to ensure that the driver 4 can orientate himself In FIG. 3b the driver looks out of the side window 28.1. His direct field of vision Bd includes the reflection R2 of FIG. 2, which has been considerably reduced by dimming the lighting of the instruments 14. The monitor 16 may also be dimly lit in order to give the driver a means of orientation.

Adaptation of the lighting brightness may depend on one hand, on the respective viewing direction, and on the other on the change in viewing direction and could thus increase or decrease in steps or gradually, depending into which direction the driver turns his eyes to look.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for controlling a lighting brightness of a lit motor vehicle instrument comprising:
    ascertaining, by a controller having a memory, a viewing direction of a driver;
    determining, by the controller, a direct field of vision from the viewing direction of the driver; and
    controlling, by the controller, a first display element to increase a lighting rightness of the first display element when the first display element lies in the direct field of vision of the driver.

2. The method according to claim 1, further comprises:
    determining, by the controller, a peripheral field of vision from the viewing direction of the driver; and
    decreasing, by the controller, the lighting brightness of the first display element when the first display element lies in the peripheral field of vision of the driver.

3. The method according to claim 1, wherein a position of the eyes of the driver is ascertained by the controller.

4. The method according to claim 1, wherein locations of reflections of the illumination of the first display element are calculated from a position and alignment of windows of the motor vehicle, wherein the lighting brightness of the first display element is reduced, if the reflections of the first display element lies in the field of vision of the driver.

5. The method according to claim 4, wherein an eye position of the driver is ascertained and included in the calculation of the locations of reflections of the first display element.

6. The method according to claim 1, wherein the lighting brightness of the first display element comprises several steps and the lighting brightness of the first display element is set to a medium brightness, if the first display element lies in the peripheral field of vision of the driver.

7. The method according to claim 1, wherein a change in the viewing direction of the driver is detected, wherein for a change in viewing direction of the driver in direction towards the first display element the lighting brightness of the first display element is increased and wherein for a change in viewing direction of the driver away from the first display element the lighting brightness of the first display element is decreased.

8. The method according to claim 1, wherein a change in the viewing direction is detected and wherein for a change in viewing direction in the direction of a reflection of the first display element in a window the lighting brightness of the first display element is decreased.

9. A computer program product with a non-transitory computer-readable storage medium, which has commands embedded in it, which when executed by a computer unit cause the computer unit to execute the method according to claim 1.

10. A motor vehicle comprising at least one lit first display element and at least one viewing direction sensor, which serves to detect the viewing direction of a driver of the motor vehicle and to ascertain a direct field of vision and a peripheral field of vision of the driver, wherein a control for the first display element is provided which is adapted to set the lighting brightness of the first display element in dependence of the viewing direction, the direct field of vision and the peripheral field of vision of the driver.

11. The motor vehicle according to claim 10, further comprising an eye position sensor for detecting the position of the eyes of the driver in the motor vehicle.

12. The motor vehicle according to claim 10, wherein the lighting of the first display element can assume at least two of following lighting brightnesses: off, maximum and an intermediate state between off and maximum.

13. The motor vehicle according to claim 10, wherein a data store is provided, in which the eyes of the at least one first display element and the position of at least one window of the motor vehicle are stored.

14. The motor vehicle according to claim 10, wherein the at least one viewing direction sensor comprises a camera.

15. The motor vehicle according to claim 10, wherein the at least one viewing direction sensor comprises an infrared source.

\* \* \* \* \*